United States Patent
Ying

(10) Patent No.: US 12,441,167 B1
(45) Date of Patent: Oct. 14, 2025

(54) FIXING MEMBER AND ROLLING COVER

(71) Applicant: Xiaoqian Ying, Zhejiang (CN)

(72) Inventor: Xiaoqian Ying, Zhejiang (CN)

( * ) Notice: Subject to any disclaimer, the term of this patent is extended or adjusted under 35 U.S.C. 154(b) by 0 days.

(21) Appl. No.: 19/224,803

(22) Filed: May 31, 2025

(30) Foreign Application Priority Data

Aug. 30, 2024 (CN) .......................... 202422119895.2

(51) Int. Cl.
 *B60J 7/06* (2006.01)
 *B60J 7/08* (2006.01)
 *B60J 7/185* (2006.01)

(52) U.S. Cl.
 CPC .............. *B60J 7/068* (2013.01); *B60J 7/085* (2013.01); *B60J 7/185* (2013.01)

(58) Field of Classification Search
 CPC .................................. B60J 7/068; B60J 7/085
 USPC ...................... 296/98, 100.17, 100.09, 100.1
 See application file for complete search history.

(56) References Cited

U.S. PATENT DOCUMENTS

| | | | | |
|---|---|---|---|---|
| 4,889,381 A * | 12/1989 | Tamblyn | ................. | B60J 7/068 296/100.09 |
| 4,890,967 A * | 1/1990 | Rosenbaum | ............ | F16B 37/14 411/910 |
| 5,096,250 A * | 3/1992 | Menz | ....................... | B60J 7/068 296/105 |
| 5,251,950 A * | 10/1993 | Bernardo | ................ | B60J 7/041 296/100.09 |
| 5,330,246 A * | 7/1994 | Bernardo | ................. | B60J 7/068 160/130 |
| 6,116,673 A * | 9/2000 | Clonan | ..................... | B60R 9/00 296/3 |
| 7,407,141 B2 * | 8/2008 | Boulard | .................. | B60J 7/104 296/100.18 |
| 8,264,827 B2 * | 9/2012 | Yuan | ..................... | F16B 5/0664 248/924 |
| 10,617,017 B2 | 4/2020 | Park | | |
| 10,940,743 B2 * | 3/2021 | Aubrey | ..................... | B60P 7/06 |
| 10,993,337 B2 | 4/2021 | Shin | | |
| D918,619 S * | 5/2021 | Xia | ............................... | D6/575 |
| 12,251,997 B2 * | 3/2025 | Qiu | .......................... | B60J 7/141 |
| D1,081,194 S * | 7/2025 | Ying | .......................... | D6/575 |
| 2017/0066311 A1* | 3/2017 | Facchinello | ............ | B60J 7/198 |

(Continued)

*Primary Examiner* — Jason S Morrow
(74) *Attorney, Agent, or Firm* — Ying-Ting Chen

(57) ABSTRACT

The present utility model relates to a fixing member and a rolling cover. The fixing member includes a first plate, a second plate, and a second connecting assembly, where the first plate is provided with a first connecting assembly for connecting the rolling cover; the second plate and the first plate are arranged in an included angle; the second connecting assembly is connected to a pickup truck bed to fix the rolling cover to the pickup truck bed; and the second connecting assembly is capable of adjusting connecting positions at different heights to be clamped on pickup truck beds at different heights. According to the fixing member and the rolling cover in the present utility model, the fixing member can adjust an adaptive height according to the different pickup truck beds, one fixing member can be adapted to different models of pickup truck beds, and when a user replaces a pickup truck, the rolling cover does not need to be replaced, and all that is needed is to mount the rolling cover on the different pickup truck beds.

16 Claims, 11 Drawing Sheets

(56) References Cited

U.S. PATENT DOCUMENTS

2020/0324633 A1\* 10/2020 Shi .......................... B60J 7/198
2024/0294056 A1\* 9/2024 Tam ....................... F16D 11/14

\* cited by examiner

FIXING MEMBER AND ROLLING COVER

TECHNICAL FIELD

The present utility model relates to the field of carrying of pickup trucks, in particular to a fixing member and a rolling cover.

BACKGROUND

A user often drives a pickup truck during load-bearing off-road activities and frequent camping in the wild. Since the user loads a truck bed of the pickup truck with many articles such as sports equipment or food, it is often needed to fix a rolling cover to the truck bed so as to prevent the loaded articles from falling out of the truck bed. According to the existing rolling cover, the rolling cover is generally directly fixed to the truck bed of the pickup truck through screws, for example, the Chinese patent document CN219904023U discloses a mounting device for a pickup truck bed, by fixedly connecting a fixing plate to truck body side plates, the phenomenon that the mounting device slides forwards and backwards along a clamping surface can be avoided. However, the mounting device cannot adjust an adaptive height according to the different pickup truck beds, one mounting device can only be adapted to one model of pickup truck bed, when the user replaces the pickup truck, the rolling cover needs to be replaced synchronously, and the operation is inconvenient.

SUMMARY

The present utility model aims to provide a fixing member and a rolling cover, so as to solve the problem that a mounting device cannot adjust an adaptive height according to different pickup truck beds, one mounting device can only be adapted to one model of pickup truck bed, when a user replaces a pickup truck, a rolling cover needs to be replaced synchronously, and the operation is inconvenient.

To solve the above technical problem, the present utility model adopts the following technical solutions:

a fixing member, including:
a first plate, which is provided with a first connecting assembly for connecting a rolling cover;
a second plate, the second plate and the first plate being arranged in an included angle; and
a second connecting assembly, which is connected to a pickup truck bed to fix the rolling cover to the pickup truck bed,
where the second connecting assembly is capable of moving relative to the second plate to adjust different connecting positions.

In one of the embodiments, the second plate is provided with a sliding groove, the sliding groove extends in a height direction, the second connecting assembly is capable of moving along the sliding groove, and the second connecting assembly penetrates through the sliding groove and then is connected to the pickup truck bed.

In one of the embodiments, the second connecting assembly includes a nut and a bolt, the nut is arranged on one side of the second plate close to the pickup truck bed, and the bolt penetrates through the second plate and the pickup truck bed and then is in threaded connection with the nut.

In one of the embodiments, a detachable screw cap is arranged at one end of the bolt away from the nut, and the outside of the screw cap is movably sleeved with a protective cap provided with a space inside.

In one of the embodiments, stabilizing grooves with dimensions smaller than the thickness of the second plate are formed at equal intervals along an edge of the sliding groove on a side surface of the sliding groove close to the first plate, and the stabilizing grooves are in communication with the sliding groove and are suitable to accommodate the protective cap.

In one of the embodiments, the fixing member further includes a fixing plate, where the fixing plate is arranged on one side of the second plate close to the pickup truck bed, and the nut is arranged on the fixing plate.

In one of the embodiments, the fixing plate is provided with a recess matched with the nut, and the nut is accommodated in the recess.

In one of the embodiments, non-slip lines are arranged on one side of the fixing plate close to the second plate.

In one of the embodiments, the fixing member further includes a gasket, where the gasket is arranged between the second plate and the pickup truck bed.

In one of the embodiments, when the gasket extends linearly from one end to the other end, a horizontal section of the gasket gradually decreases and forms a right-angled trapezoidal structure; a side surface of the gasket close to the second plate is movably attached to a side surface of the second plate; and a side surface of the gasket away from the second plate is inclined and forms an included angle with the side surface of the second plate.

In one of the embodiments, a plurality of clamping blocks are arranged on two opposite sides of the gasket in a width direction of the second plate, and the clamping blocks are clamped with the second plate, so that the gasket is fixed to the second plate.

In one of the embodiments, replacement grooves are formed in sidewalls of two sides of the second plate, wear-resisting plates are arranged in the replacement grooves, and surfaces of the clamping blocks close to the second plate are in contact with surfaces of the wear-resisting plates.

The present utility model further provides a rolling cover, including:
sliding rails; and
a roller shutter, which moves along the sliding rails.

In one of the embodiments, a limiting groove is formed in one side of each of the sliding rails facing the fixing member, the first connecting assembly is provided with a limiting portion and a connecting portion which are connected to each other, part of the structure of the limiting portion is embedded into the limiting groove to prevent the first connecting assembly from being separated from the limiting groove, and the connecting portion is connected to the first plate.

In one of the embodiments, the first connecting assembly is provided with a clamping portion and a cylindrical member which are connected to each other, and the first connecting assembly is further provided with a locking assembly for locking the cylindrical member; part of the structure of the clamping portion is suitable to be embedded into the limiting groove to prevent the first connecting assembly from being separated from the limiting groove; and the cylindrical member is connected to the first plate.

In one of the embodiments, the locking assembly includes:
a sliding track, which is of a hollowed-out structure, is arranged at the bottom of the first plate, allows an end of the cylindrical member to pass through, and is provided with a track groove with an opening;

a sliding block, which slides on the track groove, where a cylindrical slot allowing the end of the cylindrical member to pass through is formed in the middle of the sliding block, and device cavities in communication with each other are respectively and symmetrically formed on two sides of the cylindrical slot;

locking members, which are accommodated and slide in the device cavities, where moving ends of the locking members are in contact with a sidewall of the cylindrical member, and the locking members clamp the cylindrical member; and pressing members, which drive the locking members to move linearly.

In one of the embodiments, the locking assembly further includes positioning grooves, two groups of positioning grooves are provided and are symmetrically formed on two sides of the cylindrical member, each group of positioning grooves includes a plurality of positioning grooves which are linearly arranged at equal intervals in an extending direction of the cylindrical member, and the positioning grooves are movably clamped with ends of the locking members.

In one of the embodiments, a first fixing block is connected to an inner top wall of each of the device cavities, and a first positioning sliding groove slidingly connected to the first fixing block is formed in each of the locking members.

In one of the embodiments, each of the pressing members includes a pressing strip, a driving rack, a driven rack, and a rotating gear, the driven rack is connected to the locking member, the driving rack is connected to the pressing strip, the rotating gear is rotationally connected in the device cavity through a rotating shaft and is located between the driving rack and the driven rack, and the driving rack and the driven rack are respectively engaged with the rotating gear;

a second fixing block is connected in each of the device cavities, a second positioning sliding groove slidingly connected to the second fixing block is formed in the pressing strip, and one end of the pressing strip penetrates through the sliding block and extends outside; and a telescopic spring is connected between each of the locking members and each of the pressing strips.

In one of the embodiments, toothed grooves movably clamped with each other are respectively formed in side surfaces of opposite sides of the sliding track and the sliding block.

It can be seen from the above technical solutions that the embodiments of the present utility model at least have the following advantages and positive effects:

according to the fixing member and the rolling cover in the embodiments of the present utility model, the fixing member includes the first plate, the second plate, and the second connecting assembly, the second connecting assembly can adjust different connecting positions in the height direction relative to the second plate to be clamped on pickup truck beds at different heights, the fixing member can adjust an adaptive height according to the different pickup truck beds, one fixing member can be adapted to different models of pickup truck beds, and when a user replaces a pickup truck, the rolling cover does not need to be replaced, and all that is needed is to mount the rolling cover on the different pickup truck beds.

BRIEF DESCRIPTION OF THE DRAWINGS

In order to explain embodiments of the present utility model or technical solutions in the prior art more clearly, drawings needed in descriptions of the embodiments or the prior art will be briefly introduced below. Obviously, the drawings in the following descriptions are only some embodiments of the present utility model, and for a person of ordinary skill in the art, other drawings can be obtained according to structures shown in these drawings without involving any inventive effort.

Figure 1:
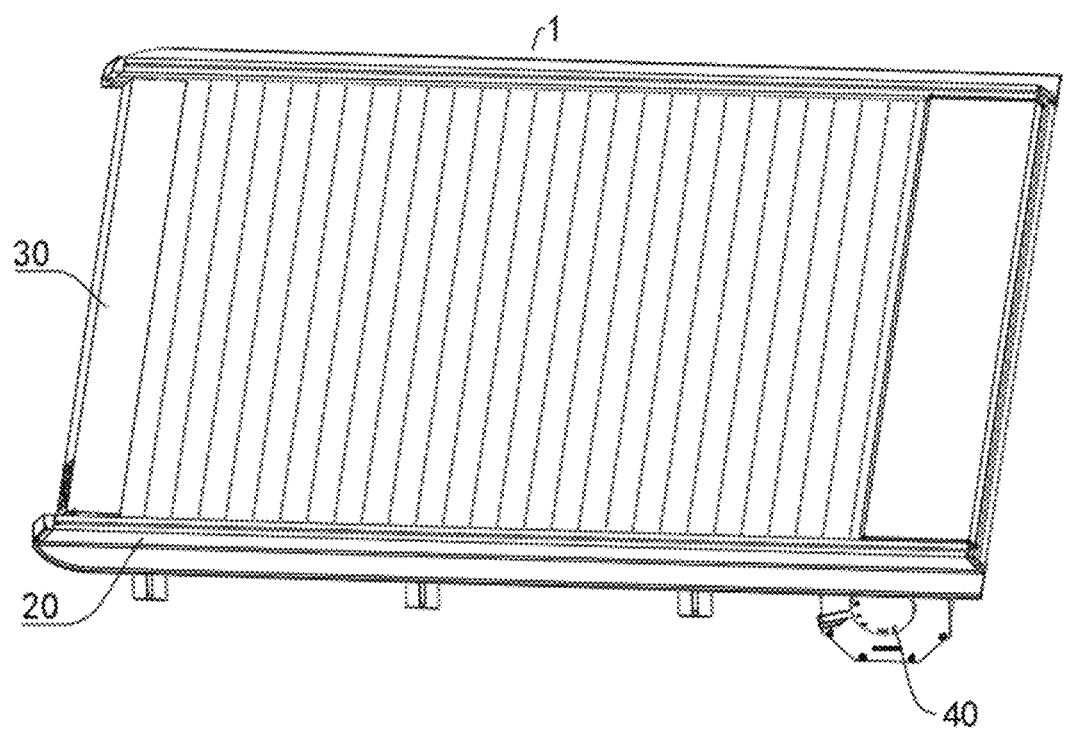
FIG. 1 is an overall structural schematic diagram of a rolling cover in an embodiment of the present utility model.

The description of reference numerals is as follows:

1. rolling cover; 10. fixing member; 100. first plate; 111. limiting portion; 112. connecting portion; 200. second plate; 210. sliding groove; 300. second connecting assembly; 310. nut; 320. bolt; 400. fixing plate; 410. recess; 420. non-slip line; 500. gasket; 510. clamping block; 20. sliding rail; 21. limiting groove; 30. roller shutter; 40. driving device; 41. screw cap; 42. protective cap; 43. stabilizing groove; 44. replacement groove; 45. wear-resisting plate; 46. clamping portion; 47. cylindrical member; 48. sliding track; 49. track groove; 50. sliding block; 51. cylindrical slot; 52. device cavity; 53. locking member; 54. positioning groove; 55. first fixing block; 56. first positioning sliding groove; 57. pressing strip; 58. driving rack; 59. driven rack; 60. rotating gear; 61. rotating shaft; 62. second fixing block; 63. second positioning sliding groove; 64. telescopic spring; and 65. toothed groove.

DETAILED DESCRIPTION OF EMBODIMENTS

Typical embodiments that show the characteristics and advantages of the present utility model will be described in detail in the following description. It should be understood that the present utility model can have various changes in different embodiments, which do not depart from the scope of the present utility model. In addition, the description and drawings herein are essentially for the purpose of describing, instead of limiting the present utility model.

Besides, the terms "first" and "second" are only for the purpose of describing, and cannot be understood as indicating or implying the relative importance or implicitly indicating the number of technical features indicated. Thus, the features defined as "first" and "second" may explicitly or implicitly include one or more such features. In the description of the present application, unless otherwise explicitly specified, "a plurality of" means two or more.

In the description of the present application, it should also be noted that unless otherwise specified and limited, the terms "arrangement", "connecting" and "connection" should be understood in a broad sense, for example, they may be fixed connection, and may also be detachable connection or integrated connection; they may be mechanical connection, and may also be electrical connection; and they may be direct connection, and may also be indirect connection by means of intermediate media or communication of the interiors of two elements. The specific meanings of the above terms in the present application may be understood by those of ordinary skill in the art according to specific circumstances.

Figure 2:
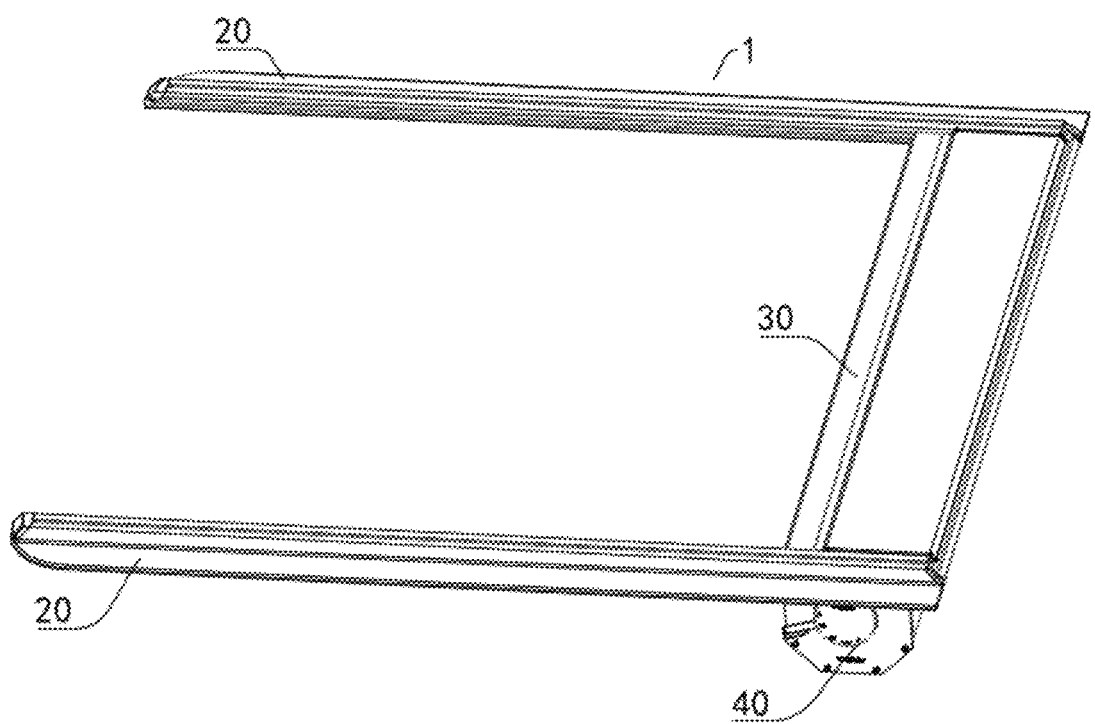
FIG. 2 is a structural schematic diagram of the rolling cover as shown in FIG. 1 in an open state.

Reference is first made to FIG. 1 and FIG. 2. The present utility model provides a rolling cover 1 which is used for shielding a truck bed of a pickup truck. The rolling cover 1 has an open state as shown in FIG. 1 and a storage state as shown in FIG. 2. When the rolling cover 1 is in the open state, the rolling cover 1 can prevent cargoes or sports equipment in the pickup truck bed from being exposed to wind and rain; and when the rolling cover 1 is in the storage state, a user can carry the cargoes in the pickup truck bed. It can be understood that the rolling cover 1 can be used for shielding carrier vehicles such as cars and heavy-duty cargo trucks in addition to the truck bed of the pickup truck.

Figure 3:
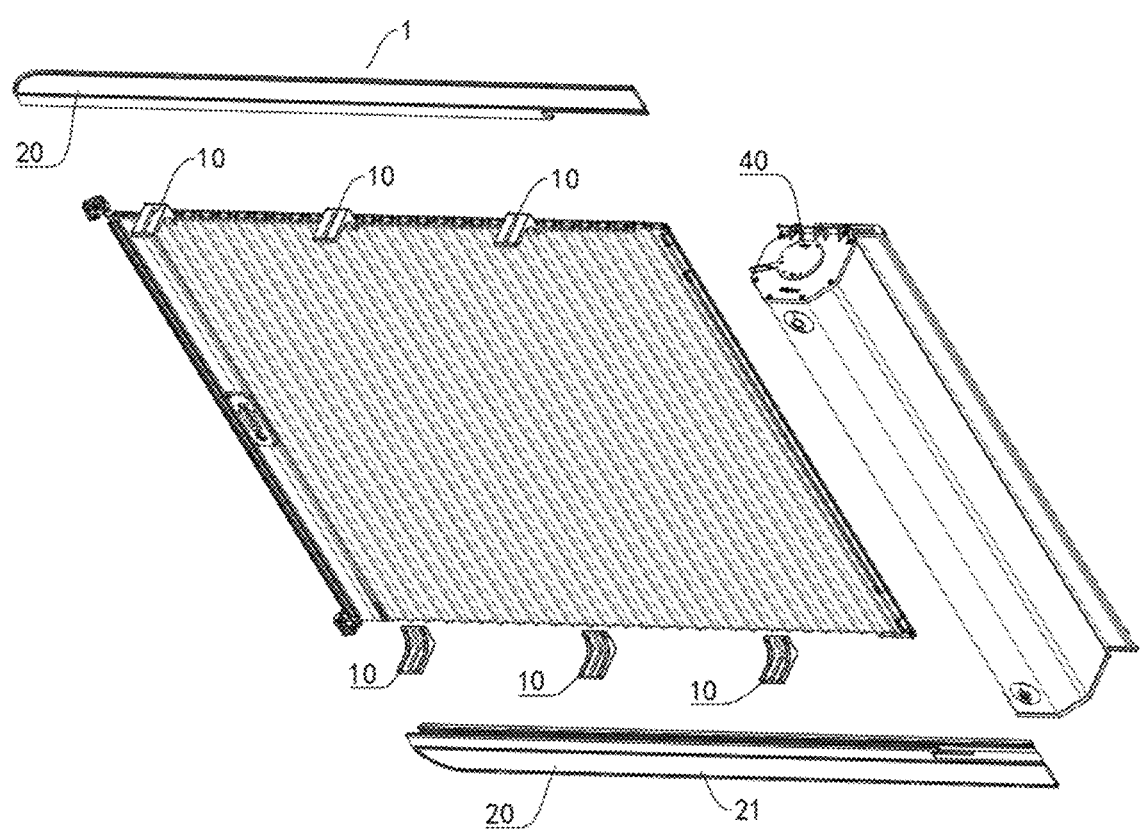
FIG. 3 is an exploded structural schematic diagram of the rolling cover as shown in FIG. 1.

Reference is made to FIG. 3. The rolling cover 1 includes a plurality of fixing members 10, sliding rails 20, and a roller shutter 30, where the roller shutter 30 can move along the sliding rails 20; and one end of each fixing member 10 is fixed to the sliding rail 20, and the other end thereof is fixed to the pickup truck bed, thereby fixing the rolling cover 1 to the pickup truck bed. It should be noted that in this embodiment, there are four fixing members 10, and the four fixing members 10 are arranged at intervals; and it can be understood that in other embodiments, there may also be six or eight fixing members 10, and the number of the fixing members 10 is not specifically defined in the present utility model.

Reference is made to FIG. 1 and FIG. 2. It should be noted that in this embodiment, the rolling cover 1 further includes a driving device 40, where the driving device 40 can drive the roller shutter 30 to move relative to the sliding rails 20. It can be understood that in other embodiments, there may be no driving device 40, and then the roller shutter 30 needs to be controlled manually to move relative to the sliding rails 20.

Reference is made to FIG. 3. It should be noted that a limiting groove 21 is formed in one side of each sliding rail 20 facing the fixing member 10.

Figure 4:
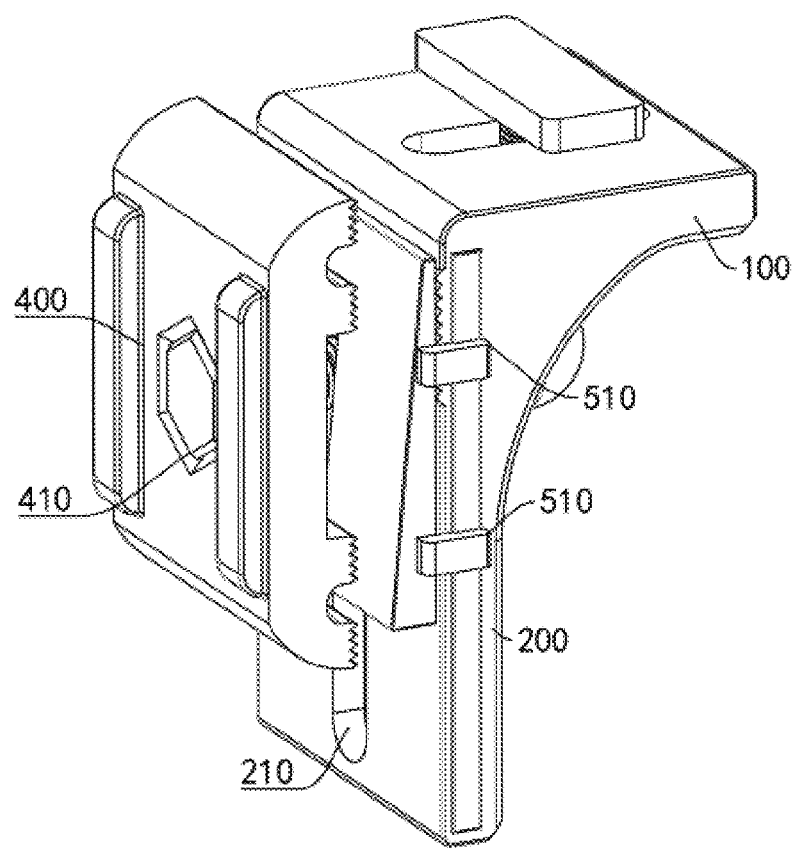
FIG. 4 is an overall structural schematic diagram of a fixing member as shown in FIG. 3.
Figure 5:
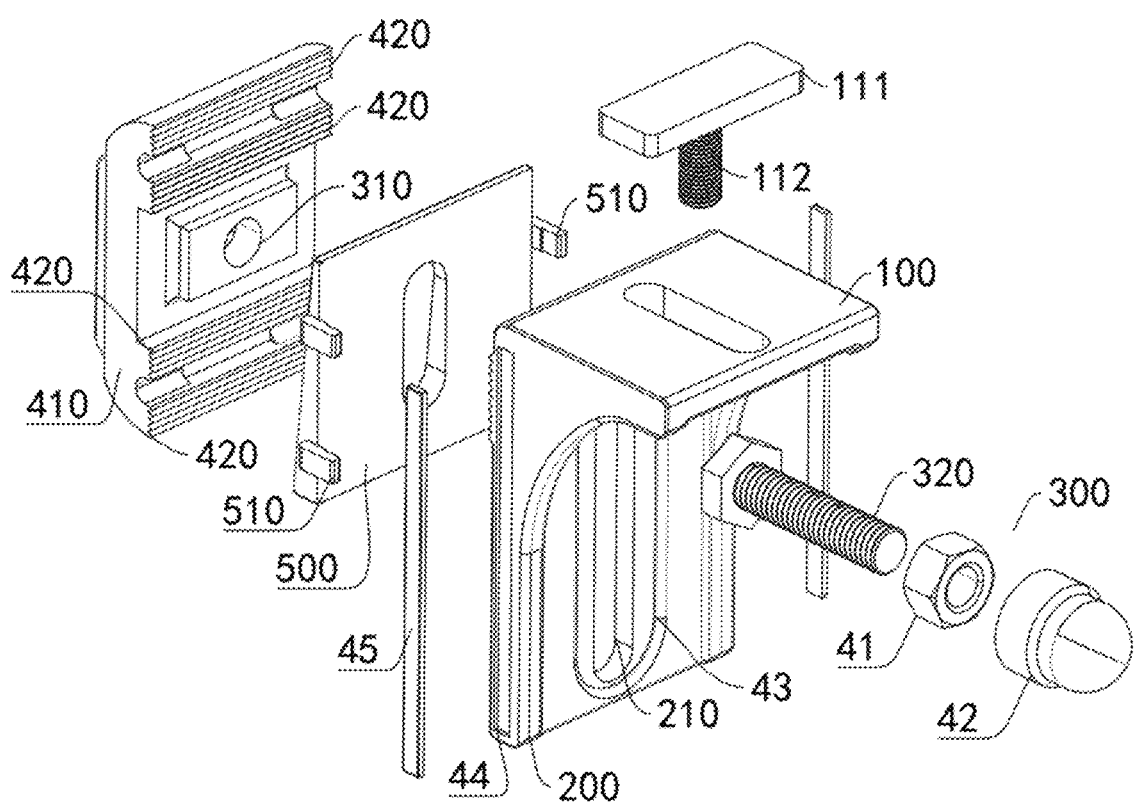
FIG. 5 is an exploded structural schematic diagram of the fixing member as shown in FIG. 4.
Figure 6:
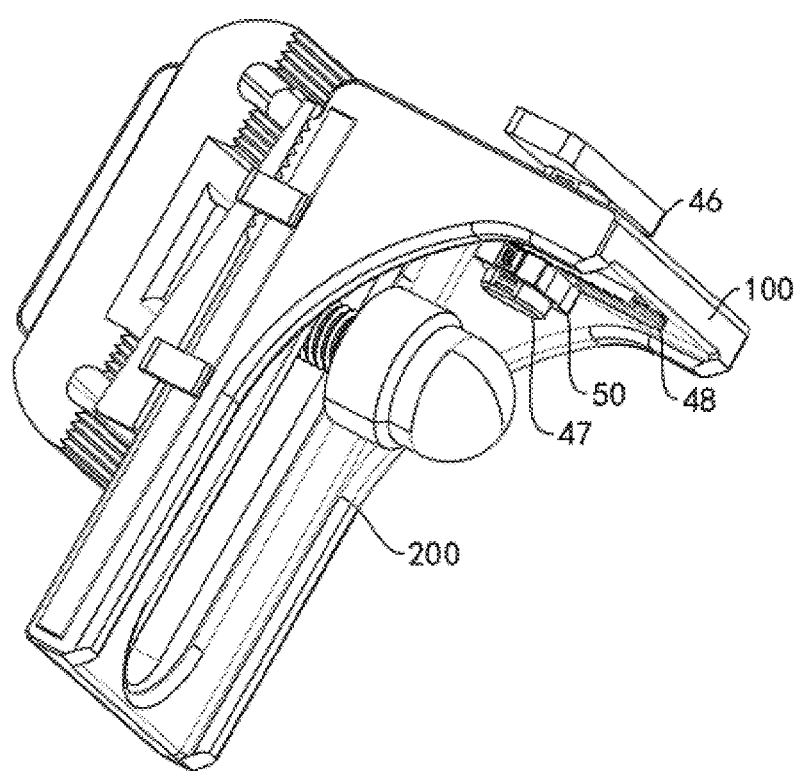
FIG. 6 is a structural schematic diagram of a second implementation manner of a first connecting assembly.

Reference is made to FIG. 4 and FIG. 5. The fixing member 10 includes a first plate 100 and a second plate 200, the first plate 100 and the second plate 200 are arranged in an included angle, the first plate 100 is provided with a first connecting assembly for being connected to the sliding rail 20, the first connecting assembly is provided with a limiting portion 111 and a connecting portion 112 which are connected to each other, an end of the limiting portion 111 is embedded into a limiting groove 21 to prevent the first connecting assembly from being separated from the limiting groove 21, and the connecting portion 112 is connected to the first plate 100.

The structure of the first connecting assembly is a first implementation manner of the first connecting assembly in the present disclosure, and it is connected to the first plate 100 mainly through the connecting portion 112 in a bolt shape.

Reference is made to FIG. 6-FIG. 11. A second implementation manner of the first connecting assembly is as follows: the first connecting assembly is provided with a clamping portion 46 and a cylindrical member 47 which are connected to each other, and the first connecting assembly is further provided with a locking assembly for locking the cylindrical member 47; part of the structure of the clamping portion 46 is suitable to be embedded into the limiting groove 21 to prevent the first connecting assembly from being separated from the limiting groove 21; the cylindrical member 47 is connected to the first plate 100; the clamping portion 46 is clamped and embedded into the limiting groove 21, and the cylindrical member 47 penetrates through and is connected to the first plate 100; and the cylindrical member 47 can be limited by the locking assembly, thereby connecting and fixing the sliding rail 20 and the fixing member 10.

The locking assembly includes: a sliding track 48, a sliding block 50, locking members 53, and pressing members. Specifically, the sliding track 48 is of a hollowed-out structure, is arranged at the bottom of the first plate 100, allows an end of the cylindrical member 47 to pass through, and is provided with a track groove 49 with an opening; the sliding block 50 slides on the track groove 49 and can be conveniently dismounted when not in use, a cylindrical slot 51 allowing the end of the cylindrical member 47 to pass through is formed in the middle of the sliding block 50, and device cavities 52 in communication with each other are respectively and symmetrically formed on two sides of the cylindrical slot 51; and two locking members are provided corresponding to the device cavities 52 and are respectively located in the corresponding device cavities 52.

The locking members 53 are accommodated and slide in the device cavities 52, moving ends of the locking members are in contact with a sidewall of the cylindrical member 47, and the locking members clamp the cylindrical member 47; and the pressing members drive the locking members 53 to move linearly.

Figure 9:
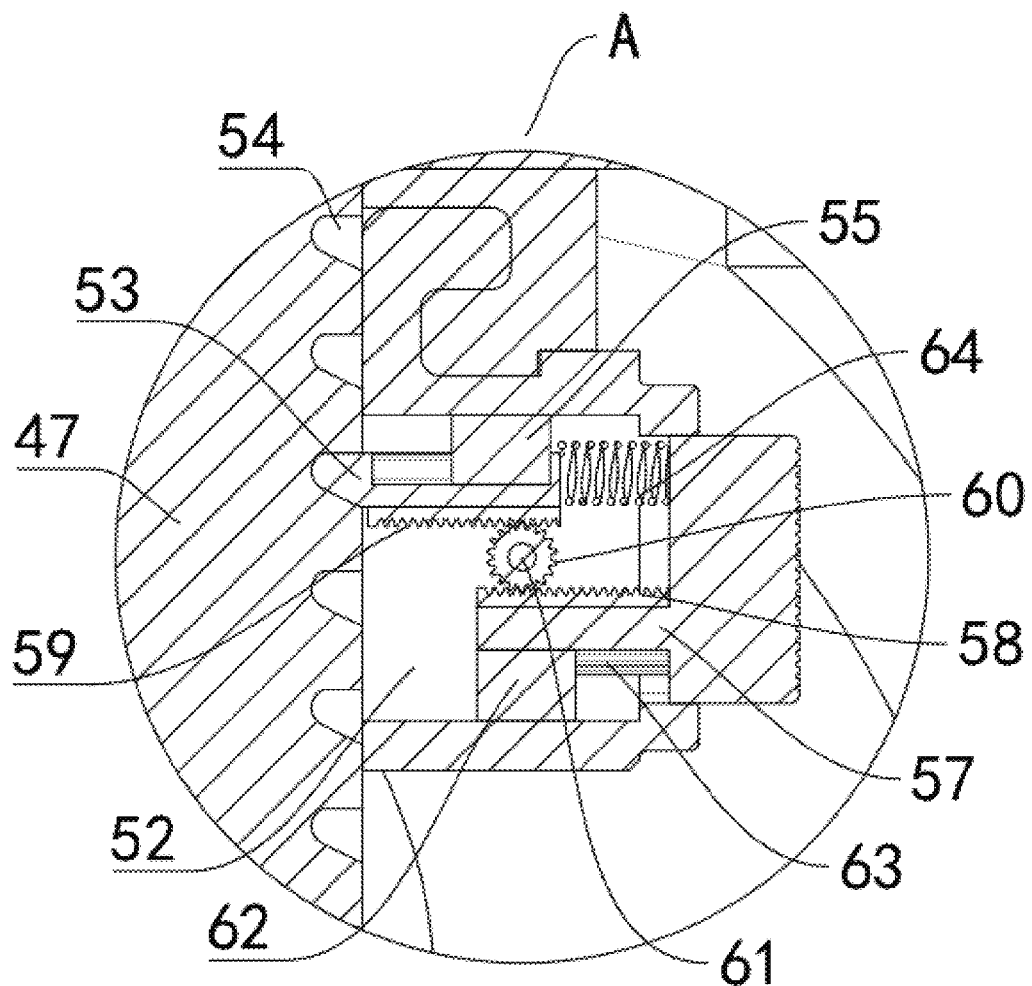
FIG. 9 is an enlarged schematic diagram of a structure at A in FIG. 8.
Figure 10:
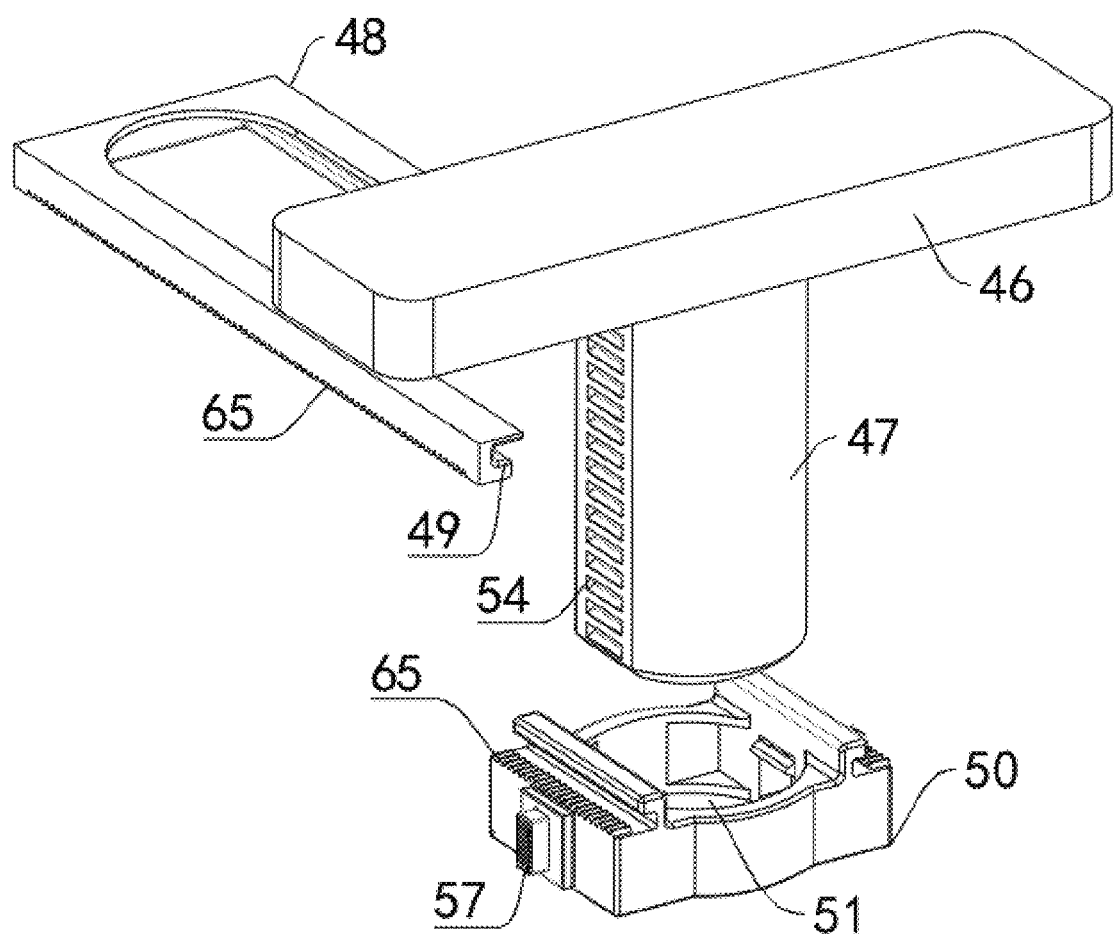
FIG. 10 is an exploded structural schematic diagram of the second implementation manner of the first connecting assembly as shown in FIG. 6.
Figure 11:
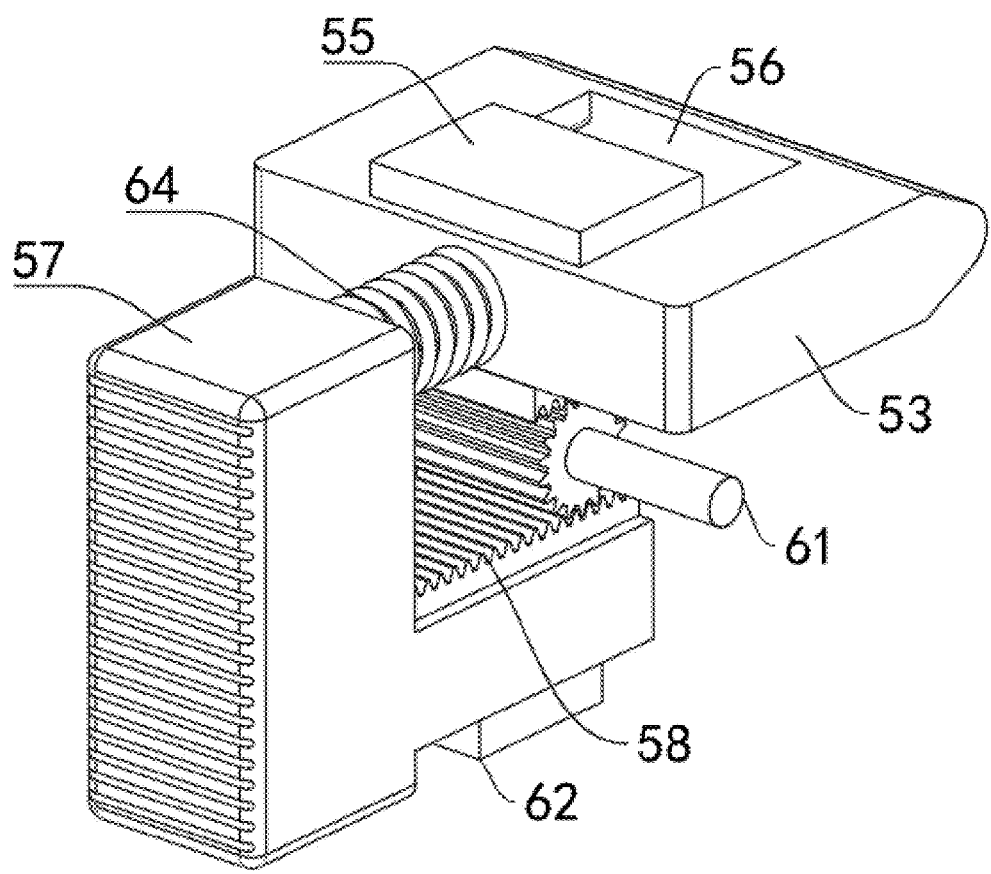
FIG. 11 is a partial structural schematic diagram of FIG. 10.

Reference is made to FIG. 9. The locking assembly further includes positioning grooves 54, two groups of positioning grooves 54 are provided and are symmetrically formed on two sides of the cylindrical member 47, each group of positioning grooves 54 includes a plurality of positioning grooves which are linearly arranged at equal intervals in an extending direction of the cylindrical member 47, and the positioning grooves 54 are movably clamped with ends of the locking members 53; when the cylindrical member 47 vertically moves, it extrudes and pushes the locking members 53 to transversely move, and when the locking members 53 are limited, the cylindrical member 47 can be limited.

A first fixing block 55 is connected to an inner top wall of each device cavity 52, and a first positioning sliding groove 56 slidingly connected to the first fixing block 55 is formed in each locking member 53.

Reference is made to FIG. 9. Each pressing member includes a pressing strip 57, a driving rack 58, a driven rack 59, and a rotating gear 60, the driven rack 59 is connected to the locking member 53, the driving rack 58 is connected to the pressing strip 57, the rotating gear 60 is rotationally connected in the device cavity 52 through a rotating shaft 61 and is located between the driving rack 58 and the driven rack 59, and the driving rack 58 and the driven rack 59 are respectively engaged with the rotating gear 60; the pressing strip 57 is pressed to drive the driving rack 58 to move, the driven rack 59 is then driven by the rotating gear 60 to move, and the driving rack 58 and the driven rack 59 are opposite in movement direction, so that the locking member 53 can be pulled out of the positioning grooves 54 to remove the restraining of the cylindrical member 47.

A second fixing block 62 is connected in each device cavity 52, a second positioning sliding groove 63 slidingly connected to the second fixing block 62 is formed in the pressing strip 57, and one end of the pressing strip 57 penetrates through the sliding block 50 and extends outside; a telescopic spring 64 is connected between each locking member 53 and each pressing strip 57, under the action of the telescopic spring 64, the end of the locking member 53 is always clamped with one of the positioning grooves 54, when the locking member 53 is in a specific shape of the positioning groove 54, the opposite movement of the cylindrical member 47 is locked, then the cylindrical member 47 and the clamping portion 46 can be stabilized, and the fixing member 10 can be stably connected to the sliding rail 20.

Toothed grooves 65 movably clamped with each other are respectively formed in side surfaces of opposite sides of the sliding track 48 and the sliding block 50, so that the transverse movement of the sliding block 50 can be limited through the sliding track 48.

In the first implementation manner of the first connecting assembly, the fixing member 10 is fixed to the sliding rail 20 mainly in a bolt fixing and connecting manner; in a second implementation manner of the first connecting assembly, the fixing member 10 is fixed to the sliding rail 20 mainly in a clamping manner; compared with the second implementation manner, the first implementation manner of the first connecting assembly is stabler during use; and compared with the first implementation manner, the second implementation manner of the first connecting assembly is more convenient during use, and the purpose of quickly dismounting the fixing member 10 from the sliding rail 20 can be achieved.

Reference is made to FIG. 4 and FIG. 5. It should be noted that in this embodiment, the included angle between the first plate 100 and the second plate 200 is 90°. In other embodiments, the included angle can also be set as other angles. The included angle between the first plate 100 and the second plate 200 is not specifically defined in the present utility model.

It should be noted that in this embodiment, the first plate 100 and the second plate 200 are configured to be of an integrally formed structure.

Reference is made to FIG. 4 and FIG. 5. The fixing member 10 further includes a second connecting assembly 300, which is connected to a pickup truck bed to fix the rolling cover 1 to the pickup truck bed.

The second connecting assembly 300 can move relative to the second plate 200 to adjust connecting positions at different heights, and the second connecting assembly 300 can be clamped with the pickup truck beds at different heights.

In summary, in the present application, the fixing member 10 includes the first plate 100, the second plate 200, and the second connecting assembly 300, the second connecting assembly 300 can adjust the different connecting positions in the height direction relative to the second plate 200 to be clamped on pickup truck beds at different heights, the fixing member 10 can adjust an adaptive height according to the different pickup truck beds, one fixing member 10 can be adapted to different models of pickup truck beds, and when the user replaces the pickup truck, the rolling cover 1 does not need to be replaced, and all that is needed is to mount the rolling cover 1 on the different pickup truck beds.

Reference is made to FIG. 4 and FIG. 5. The second plate 200 is provided with a sliding groove 210, the sliding groove 210 extends in the height direction, the second connecting assembly 300 can move along the sliding groove 210, and the second connecting assembly 300 penetrates through the sliding groove 210 and then is connected to the pickup truck bed. By providing the sliding groove 210, the user can enable the second connecting assembly 300 to move in the sliding groove 210 according to the pickup truck beds at different heights, so that the user can adjust the connecting position of the second connecting assembly 300 according to the different pickup truck beds. It can be understood that there may be no sliding groove 210, for example, a plurality of mounting holes at different heights are formed in the second plate 200, and all solutions in which the second connecting assembly 300 can adjust the different connecting positions according to the pickup truck beds at different heights should be protected.

Reference is made to FIG. 4 and FIG. 5. It should be noted that the second connecting assembly 300 includes a nut 310 and a bolt 320, the nut 310 is arranged on one side of the second plate 200 close to the pickup truck bed, and the bolt 320 penetrates through the second plate 200 and the pickup truck bed and then is in threaded connection with the nut 310. Through the matched connection between the bolt 320 and the nut 310, the rolling cover 1 is connected more firmly to the pickup truck bed, and the second connecting assembly 300 cannot be vibrated to be loosened due to jolting of the pickup truck. It can be understood that there may be no bolt 320 and nut 310, and all solutions in which the second connecting assembly 300 is connected to the pickup truck bed should be protected.

Reference is made to FIG. 5. A detachable screw cap 41 is arranged at one end of the bolt 320 away from the nut, and the outside of the screw cap 41 is movably sleeved with a protective cap 42 provided with a space inside, thereby preventing the screw cap 41 from being exposed, and preventing the screw cap 41 from being abraded.

Reference is made to FIG. 5. Stabilizing grooves 43 with dimensions smaller than the thickness of the second plate 200 are formed at equal intervals along an edge of the sliding groove 210 on a side surface of the sliding groove 210 close to the first plate 100, the stabilizing grooves 43 are in communication with the sliding groove 210 and are suitable to accommodate the protective cap 42, and the protective cap 42 is in contact with the stabilizing grooves 43, thereby preventing the contact abrasion of the bolt 320 with the sliding groove 210.

Reference is made to FIG. 4 and FIG. 5. The fixing member 10 further includes a fixing plate 400, the fixing plate 400 is arranged on one side of the second plate 200 close to the pickup truck bed, that is, the pickup truck bed is clamped by the second plate 200 and the fixing plate 400, and the rolling cover 1 is connected more stably to the pickup truck bed; and the nut 310 is arranged on the fixing plate 400, and the bolt 320 penetrates through the sliding groove 210 in the second plate 200, penetrates through the pickup truck bed, and then is in threaded connection with the nut 310 on the fixing plate 400. It can be understood that there may be no fixing plate 400 when the situation that the rolling cover 1 is connected more stably to the pickup truck bed is not considered, and all solutions in which the second connecting assembly 300 is connected to the pickup truck bed should be protected.

It should be noted that the fixing plate 400 is provided with a recess 410 matched with the nut 310, and the nut 310 is accommodated in the recess 410, so that the aesthetic degree of the fixing plate 400 and the second connecting assembly 300 is increased; meanwhile, the nut is hexagonal, the recess is also configured to have six wall surfaces, the wall surfaces of the recess can limit the rotation of the nut 310 relative to the fixing plate 400, which further prevents the second connecting assembly 300 from being vibrated to be loosened due to jolting of the pickup truck, and thus the rolling cover 1 is connected more stably to the pickup truck bed. It can be understood that there may be no recess 410 when the situation that the rolling cover 1 is connected more firmly to the pickup truck bed is not considered, and all solutions in which the second connecting assembly 300 is connected to the pickup truck bed should be protected.

Reference is made to FIG. 5. It should be noted that non-slip lines 420 are arranged on the surface of one side of the fixing plate 400 close to the second plate 200, so that the friction force between the fixing plate 400 and the pickup truck bed is increased, the fixing plate 400 is connected more stably to the pickup truck bed, and the possibility of movement of the fixing plate 400 relative to the pickup truck bed during jolting of the pickup truck is reduced. It can be understood that there may be no non-slip line 420, and all solutions in which the fixing member 10 includes the fixing plate 400 should be protected.

Reference is made to FIG. 4 and FIG. 5. The fixing member 10 further includes a gasket 500, the gasket 500 is arranged between the second plate 200 and the pickup truck bed, and the gasket 500 reduces a gap between the second plate 200 and the pickup truck bed and improves the connection stability between the second plate 200 and the pickup truck bed; meanwhile, by arranging the gasket 500, the vibration caused by jolting can be effectively buffered, thereby reducing the possibility of loosening of the second connecting assembly 300 due to vibration. It can be understood that when the situation that the second plate 200 is connected stably to the pickup truck bed is not considered, there may be no gasket 500.

Figure 7:
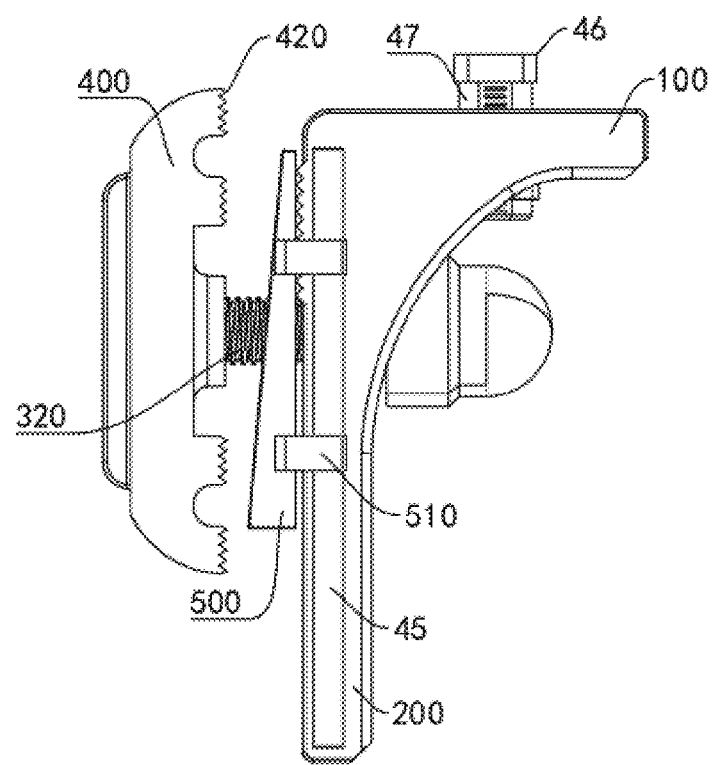
FIG. 7 is a right view of FIG. 6.
Figure 8:
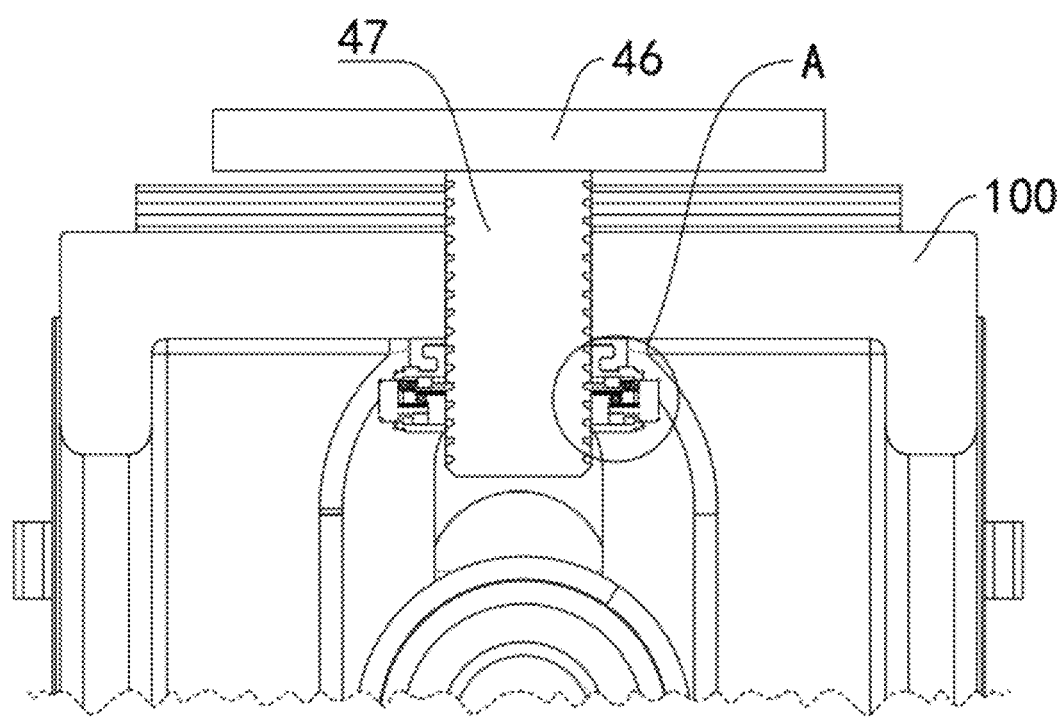
FIG. 8 is a sectional schematic diagram of a local structure as shown in FIG. 6.

Reference is made to FIG. 7. When the gasket 500 extends linearly from one end to the other end, a horizontal section of the gasket gradually decreases and forms a right-angled trapezoidal structure; a side surface of the gasket 500 close to the second plate 200 is movably attached to a side surface of the second plate 200; a side surface of the gasket 500 away from the second plate 200 is inclined and forms an included angle with the side surface of the second plate 200; replacement grooves 44 are formed in sidewalls of two sides of the second plate 200, wear-resisting plates 45 are arranged in the replacement grooves 44, and surfaces of clamping blocks 510 close to the second plate 200 are in contact with surfaces of the wear-resisting plates 45, thereby preventing the clamping blocks 510 from being abraded with the second plate 200.

Reference is made to FIG. 4 and FIG. 5. It should be noted that a plurality of clamping blocks 510 are arranged on two opposite sides of the gasket 500 in a width direction of the second plate 200, and the plurality of clamping blocks 510 are clamped with two opposite ends of the second plate 200 in the width direction, so that the gasket 500 is fixedly connected to the second plate 200.

When the fixing member 10 is used, the gasket 500 is first clamped on the second plate 200, then the first plate 100 is fixed to the rolling cover 1 through the first connecting assembly, the rolling cover 1 is placed on the pickup truck bed, and the bolt 320 sequentially penetrates through the second plate 200 and the pickup truck bed to be in threaded connection with the nut 310; and after the four fixing members 10 are mounted, the rolling cover 1 is mounted and fixed to the pickup truck bed.

Although the present utility model is described with reference to several typical embodiments, it should be understood that the used terms are illustrative and exemplary terms instead of restrictive terms. Since the present utility model can be specifically implemented in various forms without departing from the spirit or essence of the utility model, it should be understood that the above embodiments are not limited to any foregoing detail and should be broadly explained within the spirit and scope defined by the appended claims. Therefore, all changes and modifications falling within the claims or the equivalent scope thereof should be covered by the appended claims.

What is claimed is:

1. A fixing member, comprising:
   a first plate, which is provided with a first connecting assembly for connecting a rolling cover;
   a second plate, the second plate and the first plate being arranged in an included angle; and
   a second connecting assembly, which is configured for connecting to a pickup truck bed to fix the rolling cover to the pickup truck bed,
   wherein the second connecting assembly is capable of moving relative to the second plate to adjust different connecting positions;
   the second plate is provided with a sliding groove, the sliding groove extends in a height direction, the second connecting assembly is capable of moving along the sliding groove, and the second connecting assembly penetrates through the sliding groove and then is connected to the pickup truck bed;
   the second connecting assembly comprises a nut and a bolt, the nut is arranged on one side of the second plate close to the pickup truck bed, and the bolt penetrates through the second plate and the pickup truck bed and then is in threaded connection with the nut.

2. The fixing member according to claim 1, wherein a detachable screw cap is arranged at one end of the bolt away from the nut, and the outside of the screw cap is movably sleeved with a protective cap provided with a space inside.

3. The fixing member according to claim 2, wherein stabilizing grooves with dimensions smaller than the thickness of the second plate are formed at equal intervals along an edge of the sliding groove on a side surface of the sliding groove close to the first plate, and the stabilizing grooves are in communication with the sliding groove and are suitable to accommodate the protective cap.

4. The fixing member according to claim 1, further comprising a fixing plate, wherein the fixing plate is arranged on one side of the second plate close to the pickup truck bed, and the nut is arranged on the fixing plate.

5. The fixing member according to claim 4, wherein the fixing plate is provided with a recess matched with the nut, and the nut is accommodated in the recess.

6. The fixing member according to claim 4, wherein non-slip lines are arranged on one side of the fixing plate close to the second plate.

7. The fixing member according to claim 1, further comprising a gasket, wherein the gasket is arranged between the second plate and the pickup truck bed.

8. The fixing member according to claim 7, wherein when the gasket extends linearly from one end to the other end, a horizontal section of the gasket gradually decreases and forms a right-angled trapezoidal structure; a side surface of the gasket close to the second plate is movably attached to a side surface of the second plate; and a side surface of the gasket away from the second plate is inclined and forms an included angle with the side surface of the second plate.

9. The fixing member according to claim 7, wherein a plurality of clamping blocks are arranged on two opposite sides of the gasket in a width direction of the second plate, and the clamping blocks are clamped with the second plate, so that the gasket is fixed to the second plate.

10. The fixing member according to claim 5, wherein replacement grooves are formed in sidewalls of two sides of the second plate, wear-resisting plates are arranged in the replacement grooves, and surfaces of the clamping blocks close to the second plate are in contact with surfaces of the wear-resisting plates.

11. A rolling cover, comprising:
sliding rails; and
a roller shutter, which moves along the sliding rails;
wherein a limiting groove is formed in one side of each of the sliding rails facing a fixing member, a first connecting assembly is provided with a limiting portion and a connecting portion which are connected to each other, part of the structure of the limiting portion is embedded into the limiting groove to prevent the first connecting assembly from being separated from the limiting groove, and the connecting portion is connected to a first plate;
the first connecting assembly is provided with a clamping portion and a cylindrical member which are connected to each other, and the first connecting assembly is further provided with a locking assembly for locking the cylindrical member; part of the structure of the clamping portion is suitable to be embedded into the limiting groove to prevent the first connecting assembly from being separated from the limiting groove; and the cylindrical member is connected to the first plate.

12. The fixing member according to claim 11, wherein the locking assembly comprises:
a sliding track, which is of a hollowed-out structure, is arranged at the bottom of the first plate, allows an end of the cylindrical member to pass through, and is provided with a track groove with an opening;
a sliding block, which slides on the track groove, wherein a cylindrical slot allowing the end of the cylindrical member to pass through is formed in the middle of the sliding block, and device cavities in communication with each other are respectively and symmetrically formed on two sides of the cylindrical slot;
locking members, which are accommodated and slide in the device cavities, wherein moving ends of the locking members are in contact with a sidewall of the cylindrical member, and the locking members clamp the cylindrical member; and
pressing members, which drive the locking members to move linearly.

13. The fixing member according to claim 11, wherein the locking assembly further comprises positioning grooves, two groups of positioning grooves are provided and are symmetrically formed on two sides of the cylindrical member, each group of positioning grooves comprises a plurality of positioning grooves which are linearly arranged at equal intervals in an extending direction of the cylindrical member, and the positioning grooves are movably clamped with ends of the locking members.

14. The fixing member according to claim 12, wherein a first fixing block is connected to an inner top wall of each of the device cavities, and a first positioning sliding groove slidingly connected to the first fixing block is formed in each of the locking members.

15. The fixing member according to claim 12, wherein each of the pressing members comprises a pressing strip, a driving rack, a driven rack, and a rotating gear, the driven rack is connected to the locking member, the driving rack is connected to the pressing strip, the rotating gear is rotationally connected in the device cavity through a rotating shaft and is located between the driving rack and the driven rack, and the driving rack and the driven rack are respectively engaged with the rotating gear;
a second fixing block is connected in each of the device cavities, a second positioning sliding groove slidingly connected to the second fixing block is formed in the pressing strip, and one end of the pressing strip penetrates through the sliding block and extends outside; and a telescopic spring is connected between each of the locking members and each of the pressing strips.

16. The fixing member according to claim 12, wherein toothed grooves movably clamped with each other are respectively formed in side surfaces of opposite sides of the sliding track and the sliding block.

\* \* \* \* \*